(12) United States Patent
Kawabata et al.

(10) Patent No.: US 11,955,600 B2
(45) Date of Patent: Apr. 9, 2024

(54) SOLID-STATE BATTERY (71) Applicant: MAXELL, LTD., Kyoto (JP)

(72) Inventors: Yusuke Kawabata, Kyoto (JP); Akihiro Fujimoto, Kyoto (JP); Takumi Otsuka, Kyoto (JP)

(73) Assignee: Maxell, Ltd., Kyoto (JP)

( * ) Notice: Subject to any disclaimer, the term of this patent is extended or adjusted under 35 U.S.C. 154(b) by 563 days.

(21) Appl. No.: 17/271,907

(22) PCT Filed: Aug. 31, 2020

(86) PCT No.: PCT/JP2020/032856
§ 371 (c)(1),
(2) Date: Feb. 26, 2021

(87) PCT Pub. No.: WO2021/040044
PCT Pub. Date: Mar. 4, 2021

(65) Prior Publication Data
US 2022/0311046 A1 Sep. 29, 2022

(30) Foreign Application Priority Data
Aug. 29, 2019 (JP) .................................. 2019-156633

(51) Int. Cl.
*H01M 10/0562* (2010.01)
*H01M 10/04* (2006.01)
(Continued)

(52) U.S. Cl.
CPC ... *H01M 10/0562* (2013.01); *H01M 10/0427* (2013.01); *H01M 10/0585* (2013.01);
(Continued)

(58) Field of Classification Search
CPC ........... H01M 10/0427; H01M 10/052; H01M 10/0525; H01M 10/0562; H01M 10/0585;
(Continued)

(56) References Cited

U.S. PATENT DOCUMENTS

2005/0019063 A1 1/2005 Nanno et al.

FOREIGN PATENT DOCUMENTS

EP 3 654 438 A1 5/2020
JP 2005353339 A * 12/2005
(Continued)

OTHER PUBLICATIONS

Machine translation JP2005353339A (Year: 2005).*
Extended European Search Report for European Application No. 20853582.2, dated Jul. 24, 2023.

*Primary Examiner* — Victoria H Lynch
(74) *Attorney, Agent, or Firm* — Birch, Stewart, Kolasch & Birch, LLP (57) ABSTRACT

A solid-state battery is provided that allows the exterior can to be sufficiently crimped onto the seal can without leading to improper crimping, thus preventing entry of water from the outside. The solid-state battery 1 includes an exterior can 2, a seal can 3, facing the exterior can 2 and a power generation element 4 contained in the space between the exterior can 2 and seal can 3. The seal can 3 includes a flat portion 31 and a peripheral wall 32 that are contiguous to each other with a curved-surface portion 33 provided therebetween. A first clearance g1 is defined between the upper edge of the outer peripheral surface of the power generation element 4 and the border 10 between the inner surface of the flat portion 31 and the inner surface of the curved-surface portion 33, the first clearance having a radial dimension not larger than 2.0 mm at a position where its dimension is at its largest. This will facilitate positioning of the power generation element 4 to properly place it inside the seal can 3, thereby preventing positional displacement of the power generation element 4.

10 Claims, 7 Drawing Sheets

(51) Int. Cl.
*H01M 10/0585* (2010.01)
*H01M 50/109* (2021.01)
*H01M 50/183* (2021.01)
*H01M 10/0525* (2010.01)

(52) U.S. Cl.
CPC ....... *H01M 50/109* (2021.01); *H01M 50/183* (2021.01); *H01M 10/0525* (2013.01)

(58) Field of Classification Search
CPC ............. H01M 50/109; H01M 50/153; H01M 50/167; H01M 50/183; H01M 50/186
See application file for complete search history.

(56) References Cited

FOREIGN PATENT DOCUMENTS

| | | |
|---|---|---|
| JP | 2017-162771 A | 9/2017 |
| JP | 2019-21428 A | 2/2019 |

* cited by examiner

SOLID-STATE BATTERY

TECHNICAL FIELD

The present disclosure relates to a solid-state battery.

BACKGROUND ART

Solid-state batteries, especially those having a solid electrolyte constituted by a sulfide-based solid electrolyte, experience a deterioration of battery characteristics when water enters the interior of the battery. In view of this, a solid-state battery is required to have a structure that prevents entry of water from the outside.

As a conventional technique, JP 2019-21428 A discloses a coin battery including a solid electrolyte layer (Patent Document 1). In this conventional coin battery, the side wall of the metallic seal plate (i.e., seal can) is formed by bending a plate perpendicularly to leave a flat-plate portion, and the edge portion of the side wall is bent outward to meet itself. Further, a gasket is provided between the side wall of the seal can and the side wall of the metallic case (i.e., exterior can). The edge portion of the exterior can is curved inwardly toward the edge of the bent portion of the side wall of the seal can, and crimped onto it.

The conventional coin battery is constructed to prevent entry of water from the outside by means of the crimping of the exterior can onto the seal can. However, in the conventional coin battery, the surface of the very edge of the bent portion of the seal can is so narrow that, when the edge portion of the exterior can is crimped onto this edge surface from above, an appropriate crimping pressure cannot be applied. As such, in the conventional coin battery, the exterior can is insufficiently crimped onto the seal can, potentially allowing water to enter from the outside.

JP 2017-162771 A discloses a battery, though not a solid-state battery, that has a seal can with a side wall provided with a stepped portion (Patent Document 2). In this conventional battery, the edge portion of the exterior can is curved toward the stepped portion of the side wall of the seal can, and the exterior can is crimped onto the seal can. Thus, for this battery, a sufficient crimping pressure can be applied to crimp the exterior can onto the seal can, thereby preventing entry of water from the outside.

PRIOR ART DOCUMENTS

Patent Documents

[Patent Document 1] JP 2019-21428 A
[Patent Document 2] JP 2017-162771 A

SUMMARY OF THE INVENTION

However, since a typical solid-state battery is constructed to have a rigid power generation element located inside the battery the power generation element cannot easily be positioned for some seal-can shapes, potentially resulting in some positional displacement of the power generation element. This positional displacement of the power generation element may lead to improper crimping of the exterior can onto the seal can. The coin battery of Patent Document 1 includes a pressure member provided between the flat-plate portion of the seal can and the laminated body (i.e., power generation element). If, during positioning of the power generation element inside the seal can of this coin battery, some portion of the power generation element ends up being located radially outward of the peripheral edge of the pressure member, crimping the exterior can onto the seal can may cause an inclination of the power generation element. Thus, a problem with this conventional coin battery is that a failure in positioning the power generation element relative to the pressure member, i.e., a positional displacement, may result in improper crimping of the exterior can onto the seal can. That is, the conventional coin battery does not address the issue of the positioning, and positional displacement, of the power generation element.

The battery of Patent Document 2, by virtue of the stepped portion of the peripheral wall of the seal can, ensures that the exterior can can be crimped onto the seal can with a sufficient crimping pressure. However, the battery of Patent Document 2 is not a solid-state battery and does not address the issue of the positioning and positional displacement of the power generation element.

In view of this, the problem to be solved by the present disclosure is to provide a solid-state battery that facilitates positioning of the power generation element so it can be properly placed, preventing positional displacement of the power generation element to allow the exterior can to be sufficiently crimped onto the seal can without leading to improper crimping, thus preventing entry of water from the outside.

To solve the above-stated problem, the present disclosure provides the following construction: The solid-state battery according to the present disclosure may include an exterior can having a can bottom and a cylindrical side wall. The solid-state battery may include a seal can having a flat portion and a peripheral wall and facing the exterior can. The solid-state battery may include a power generation element contained between the exterior can and the seal can and including a cathode material layer, an anode material layer, and a solid electrolyte layer located between the cathode material layer and the anode material layer. The flat portion and the peripheral wall may be contiguous to each other with a curved-surface portion provided therebetween. A first clearance may be defined between an upper edge of an outer peripheral surface of the power generation element, on one hand, and a first border between an inner surface of the flat portion and an inner surface of the curved-surface portion, on the other hand. The first clearance may have a radial dimension not larger than 2.0 mm at a position where the first clearance is at its largest.

The solid-state battery according to the present disclosure facilitates positioning of the power generation element so it can be properly placed, preventing positional displacement of the power generation element to allow the exterior can to be sufficiently crimped onto the seal can without leading to improper crimping, thus preventing entry of water from the outside.

EMBODIMENTS FOR CARRYING OUT THE INVENTION

The solid-state battery may include an exterior can having a can bottom and a cylindrical side wall. The solid-state battery may include a seal can having a flat portion and a peripheral wall and facing the exterior can. The solid-state battery may include a power generation element contained between the exterior can and the seal can and including a cathode material layer, an anode material layer, and a solid electrolyte layer located between the cathode material layer and the anode material layer. The flat portion and the peripheral wall may be contiguous to each other with a curved-surface portion provided therebetween. A first clearance may be defined between an upper edge of an outer peripheral surface of the power generation element, on one hand, and a first border between an inner surface of the flat portion and an inner surface of the curved-surface portion, on the other hand. The first clearance may have a radial dimension not larger than 2.0 mm at a position where the first clearance is at its largest.

Providing the first clearance will facilitate positioning of the power generation element so that it can be placed inside the seal can, preventing positional displacement thereof. This will allow the exterior can of the solid-state battery to be sufficiently crimped onto the seal can without leading to improper crimping, thus preventing entry of water from the outside.

A distance between a diameter of the inner surface of the flat portion and a diameter of the power generation element may be not larger than 2.0 mm. This will further facilitate positioning of the power generation element to prevent positional displacement of the power generation element.

The first clearance may have a radial dimension not smaller than 0.01 mm. Thus, the power generation element will not contact the inner surface of the curved-surface portion, thus preventing damage to the power generation element.

The peripheral wall may include a base-end portion located adjacent to the curved-surface portion, an outspread portion having a diameter larger than an outer diameter of the base-end portion and located adjacent to an open edge, and a stepped portion between the base-end portion and the outspread portion. This will allow a sufficient crimping pressure to be applied to the stepped portion in a direction generally perpendicular to radial directions of the cylindrical side wall, i.e., in the vertical direction.

The solid-state battery may further include a gasket located between the cylindrical side wall and the peripheral wall. The gasket may include a gasket bottom portion located between the can bottom and an open edge of the peripheral wall and protruding radially inwardly from the peripheral wall. A second clearance may be defined between the outer peripheral surface of the power generation element and a surface of inner circumference of the gasket bottom portion. The second clearance may have a radial dimension not larger than 2.0 mm at a position where the second clearance is at its largest. Providing the second clearance will facilitate positioning of the power generation element also with respect to portions of the power generation element adjacent to the exterior can so that it can be placed inside the seal can, further preventing positional displacement and further preventing entry of water from the outside.

A difference between an inner diameter of the surface of inner circumference of the gasket bottom portion and a diameter of the power generation element may be not larger than 2.0 mm. This will further facilitate positioning of the power generation element, thereby preventing positional displacement of the power generation element.

The second clearance may have a radial dimension not smaller than 0.01 mm. In this way, the power generation element will not be in contact with the surface of inner circumference of the gasket, thus preventing damage to the power generation element.

In some implementations, the solid-state battery may be such that a plurality of power generation elements connected in series are stacked on top of each other and contained between the can bottom and the flat portion. The first clearance may be defined between an upper edge of an outer peripheral surface of that power generation element which is located closest to the flat portion, on one hand, and the first border between the inner surface of the flat portion and the curved-surface portion, on the other hand. The second clearance may be defined between an outer peripheral surface of that power generation element which is located closest to the can bottom and the surface of inner circumference of the gasket bottom portion. This will allow the exterior can to be sufficiently crimped onto the seal can without leading to improper crimping even in a solid-state battery with a plurality of power generation elements connected in series and stacked on top of each other, thus preventing entry of water from the outside.

In other implementations, the solid-state battery may be such that a plurality of power generation elements connected in series are stacked on top of each other and contained between the can bottom and the flat portion. An inner surface of the base-end portion may have a second border between a side surface contiguous to the inner surface of the curved-surface portion and a curvature surface contiguous to the side surface and an inner surface of the stepped portion. If that power generation element located closest to the flat portion is a cathode material layer, a height distance between the inner surface of the flat portion and the second border may be smaller than a height distance between the inner surface of the flat portion and an upper edge of an outer peripheral surface of that anode material layer which is closest to the flat portion. If that power generation element located closest to the flat portion is an anode material layer, the height distance between the inner surface of the flat portion and the second border may be smaller than a height distance between the inner surface of the flat portion and an upper edge of an outer peripheral surface of that cathode material layer which is closest to the flat portion. This will prevent short circuit.

In yet other implementations, the solid-state battery may expand radially outwardly with increasing distance from the flat portion in an axial direction. This will further prevent short circuit.

First Embodiment

Figure 1:
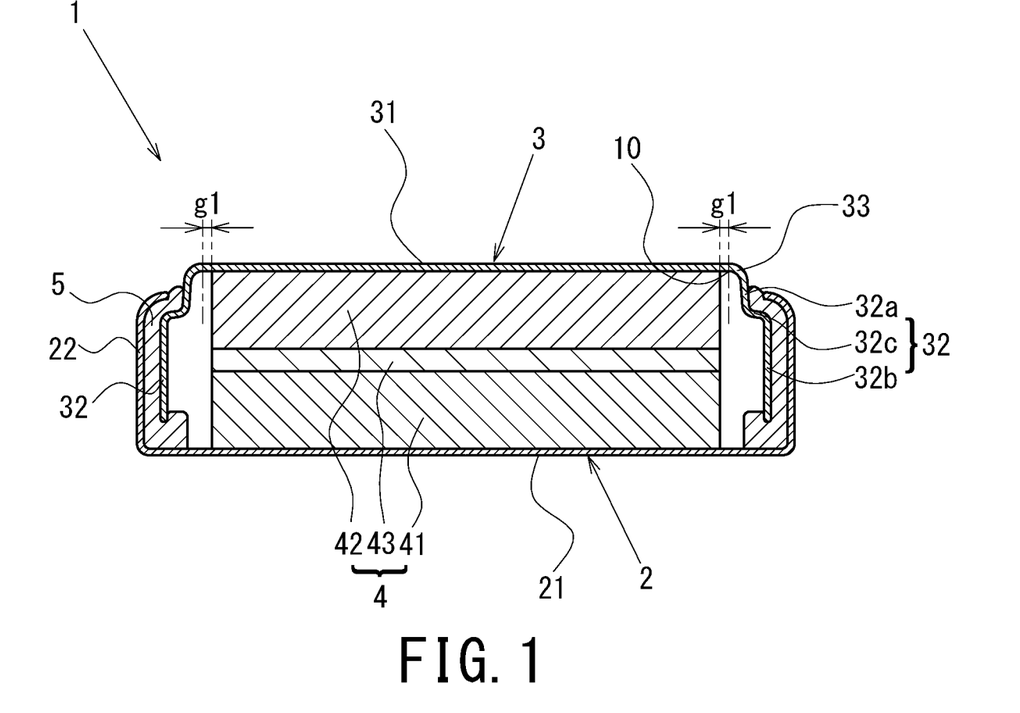
FIG. 1 is a cross-sectional view of a solid-state battery according to a first embodiment, illustrating its structure.

Now, a solid-state battery 1 according to a first embodiment of the present disclosure will be specifically described with reference to FIG. 1. First, as shown in FIG. 1, the solid-state battery 1 is basically composed of an exterior can 2, a seal can 3, a power generation element 4, and a gasket 5. In the first embodiment, the solid-state battery is a flat battery.

The exterior can 2 includes a circular bottom 21 and a cylindrical side wall 22 contiguous with the outer periphery of the can bottom 21. The cylindrical side wall 22 extends generally perpendicularly to the can bottom 21 as seen in a longitudinal cross section. The exterior can 2 is formed from a metallic material such as stainless steel. The exterior can 2 is not limited to a cylindrical shape with a circular bottom 21. For example, the exterior can 2 may be shaped such that the bottom 21 is polygonal, e.g., rectangular, in shape and the cylindrical side wall 22 has the shape of a polygonal tube, e.g., tetragonal tube, conforming to the shape of the can bottom 21, and may be modified in various ways depending on the size and/or shape of the solid-state battery 1. Thus, shapes of the cylindrical side wall 22 include not only cylindrical shapes, but polygonal-tube shapes, such as tetragonal-tube shapes.

The seal can 3 includes a circular flat portion 31 and a cylindrical peripheral wall 32 contiguous with the outer periphery of the flat portion 31 with a curved-surface portion 33 provided therebetween. The open end of the seal can 3 faces the open end of the exterior can 2. The seal can 3 is formed from a metallic material, such as stainless steel. The seal can 3 is not limited to a cylindrical shape with a circular flat portion 31. For example, the seal can 3 may be shaped such that the flat portion 31 is polygonal, e.g., rectangular, in shape and the peripheral wall 32 has the shape of a polygonal tube, e.g., tetragonal tube, conforming to the shape of the flat portion 31, and may be modified in various ways depending on the size and/or shape of the solid-state battery 1. Thus, shapes of the peripheral wall 32 include not only cylindrical shapes, but polygonal-tube shapes, such as tetragonal-tube shapes.

The peripheral wall 32 of the seal can 3 includes a base-end portion 32a located adjacent to the curved-surface portion 33, an outspread portion 32b located adjacent to the open edge and having a diameter larger than the outer diameter of the base-end portion 32a, and a stepped portion 32c between the base-end portion 32a and outspread portion 32b. Thus, the peripheral wall 32 is shaped step-wise, where the outspread portion 32b spreads outwardly relative to the base-end portion 32a.

The exterior can 2 and seal can 3, after the power generation element 4 is placed in their interior space, are joined together by means of crimping, with a gasket 5 positioned between the cylindrical side wall 22 of the exterior can 2 and the peripheral wall 32 of the seal can 3. Specifically the open ends of the exterior can 2 and seal can 3 are positioned to face each other and the peripheral wall 32 of the seal can 3 is inserted into the exterior can 2 inside its cylindrical side wall 22 before the exterior can 2 and seal can 3 are joined together by crimping, with a gasket 5 positioned between the cylindrical side wall 22 and peripheral wall 32. The edge portion of the cylindrical side wall 22 is crimped inwardly toward the stepped portion 32c of the peripheral wall 32. Thus, the edge portion of the cylindrical side wall 22 is sufficiently crimped in a direction generally perpendicular to radial directions of the cylindrical side wall 22, i.e., in the vertical direction. Details of a process of manufacturing the solid-state battery 1 will be given further below. A current collector may be provided between the power generation element 4 and the flat portion 31 of the seal can 3. A current collector may be provided between the power generation element 4 and the bottom 21 of the exterior can 2.

The flat portion 31 and peripheral wall 32 of the seal can 3 are contiguous to each other, with the curved-surface portion 33 located therebetween. The flat portion 31 and peripheral wall 32 are formed by press-forming a flat metallic plate. During this, a curved-surface portion 33 is typically formed between the flat portion 31 and peripheral wall 32. The curved-surface portion 33 refers to the section of the can starting at the border between the flat portion 31 and curved-surface portion 33 and ending at the border between the curved-surface portion 33 and peripheral wall 32. The inner surface of the curved-surface portion 33 refers to the section of the surface starting at the border 10 between the inner surface of the flat surface portion 31 and the inner surface of the curved-surface portion 33 and ending at the border between the inner surface of the curved-surface portion 33 and the inner surface of the base-end portion 32a. That is, the border 10 between the inner surface of the flat portion 31 and the inner surface of the curved-surface portion 33 runs along the outer periphery of the inner surface of the flat portion 31.

The power generation element 4 is contained in the space between the exterior can 2 and seal can 3, and includes a cathode material layer 41, an anode material layer 42 and a solid electrolyte layer 43. The solid electrolyte layer 43 is located between the cathode and anode material layers 41 and 42. From the component adjacent to the bottom 21 of the exterior can 2 (i.e., from the bottom in the drawing) outward, the cathode material layer 41, the solid electrolyte layer 43 and the anode material layer 42 are stacked in this order to form the power generation element 4. The power generation element 4 is columnar in shape. The power generation element 4 is located on the inner surface of the bottom 21 of the exterior can 2. Thus, the exterior can 2 functions as a positive-electrode can. Further, the power generation element 4 is in contact with the inner surface of the flat portion 31 of the seal can 3. Thus, the seal can 3 functions as a negative-electrode can. The power generation element 4 is not limited to a columnar shape, but may be modified in various ways depending on the size and/or shape of the solid-state battery 1, e.g., may be shaped as a rectangular parallelepiped or a prism. Further, the power generation element 4 may be positioned such that the anode material layer 42 is located adjacent to the exterior can 2 and the cathode material layer 41 is located adjacent to the seal can 3. In such implementations, the exterior can 2 functions as a negative electrode, and the seal can 3 functions as a positive electrode.

The cathode material layer 41 is a cathode pellet made of a cathode active material used in a lithium-ion secondary battery constituted by a 180 mg cathode mixture containing $LiNi_{0.6}Co_{0.2}Mn_{0.2}O_2$ with an average grain diameter of 3 μm, sulfide solid electrolyte ($Li_6PS_5Cl$), and carbon nanotubes working as a conductive aid, in a mass ratio of 55:40:5, which is formed in a mold with a diameter of 10 mm into a columnar shape. The cathode material layer 41 is not limited to any particular one as long as it can function as a cathode material layer for the power generation element 4, and may be, for example, lithium cobalt oxide, lithium nickel oxide, lithium manganese oxide, lithium nickel cobalt manganese composite oxide, or olivine-type composite oxide, or any appropriate mixture thereof. Further, the size and/or shape of the cathode material layer 41 is not limited to a columnar shape and may be modified in various ways depending on the size and/or shape of the solid-state battery 1.

The anode material layer 42 is an anode pellet made of an anode active material used in a lithium-ion secondary battery constituted by a 300 mg anode mixture containing LTO ($Li_4Ti_5O_{12}$, i.e., lithium titanate), sulfide solid electrolyte ($Li_6PS_5Cl$), and carbon nanotubes in a weight ratio of 50:45:5, which is formed into a columnar shape. The anode material layer 42 is not limited to any particular one as long as it can function as an anode material layer for the power generation element 4, and may be, for example, metallic lithium, a lithium alloy a carbon material such as graphite or low-crystalline carbon, SiO, or LTO ($Li_4Ti_5O_{12}$, i.e., lithium titanate), or any appropriate mixture thereof. Further, the size and/or shape of the anode material layer 42 is not limited to a columnar shape and may be modified in various ways depending on the size and/or shape of the solid-state battery 1.

The solid electrolyte layer 43 is a 60 mg sulfide solid electrolyte ($Li_6PS_5Cl$) formed into a columnar shape. The solid electrolyte layer 43 is not limited to a particular one, and may be a sulfur-based solid electrolyte of another type, such as an argyrodite-based one to improve ion conductivity. If a sulfur-based solid electrolyte is to be used, it is preferable to coat the surface of the cathode active material with niobium oxide to prevent reaction with the cathode active material. Alternatively, the solid electrolyte layer 43 may be a hydride-based solid electrolyte or an oxide-based solid electrolyte, for example. Further, the size and/or shape of the solid electrolyte layer 43 is not limited to a columnar shape and may be modified in various ways depending on the size and/or shape of the solid-state battery 1.

According to the present, first embodiment, a single power generation element 4 is contained in the space between the bottom 21 of the exterior can 2 and the flat portion 31 of the seal can 3.

A clearance g1, annular in shape in plan view, is formed between the upper edge of the outer peripheral surface of the power generation element 4 and the above-mentioned border 10. The clearance g1 has a radial dimension not larger than 1.0 mm. In the drawings, the clearance g1 is represented as left and right clearances, as shown in FIG. 1. Thus, the total dimension of the clearance g1 is at most 2.0 mm, or less. As the clearance g1 is thus formed between the upper edge of the outer peripheral surface of the power generation element 4 and the border 10, the power generation element 4 can be easily positioned during placement thereof inside the seal can 3. That is, the power generation element 4 is shaped as a circular column with a diameter smaller than the diameter of the border 10, i.e., the diameter of the inner surface of the flat portion 31, by 2.0 mm or less. In other words, the diameter of the power generation element 4 is smaller than the diameter of the inner surface of the flat portion 31, where the difference between the diameter of the inner surface of the flat portion 31 and the diameter of the power generation element 4 is 2.0 mm or less. Thus, the power generation element 4 can be easily positioned and placed inside the seal can 3, where it is fitted into the interior of the base-end portion 32a of the seal can 3.

Further, the clearance g1 is not larger than 1.0 mm, which is a small dimension. This prevents positional displacement during placement of the power generation element 4 inside the seal can 3, or during crimping of the exterior can 2 onto the seal can 3.

The dimension of the clearance g1 is to be not larger than 1.0 mm, preferably not larger than 0.5 mm, and more preferably not larger than 0.1 mm. That is, an excessively large dimension of the clearance g1 may make it difficult to position the power generation element 4, and also cause positional displacement. Further, an excessively large dimension of the clearance g1 means a reduced ratio of the power generation element 4 to the entire battery which means a reduced battery capacity. On the other hand, if the upper edge of the outer peripheral surface of the power generation element 4 is aligned with the border 10, i.e., if the clearance g1 is eliminated, the upper edge of the outer peripheral surface of the power generation element 4 can easily contact the inner surface of the curved-surface portion 33 during positioning of the power generation element 4 inside the seal can 3 or during crimping of the exterior can 2 onto the seal can 3. As such, the power generation element 4, when in contact with the inner surface of the curved-surface portion 33, may be damaged. In view of this, the dimension of the clearance g1 is to be not smaller than 0.01 mm, preferably not smaller than 0.05 mm, and more preferably not smaller than 0.09 mm.

As the clearance g1 is thus formed between the upper edge of the outer peripheral surface of the power generation element 4 and the border 10, the power generation element 4 of the solid-state battery 1 can be easily positioned and placed inside the seal can 3 to prevent positional displacement, while preventing damage to the power generation element 4. Thus, in the solid-state battery 1, the exterior can 2 can be sufficiently crimped onto the seal can 3 without leading to improper crimping, thereby preventing entry of water from the outside. In view of this, the dimension of the clearance g1 is to be one of the above-listed ones, which reliably provides a so-called play which takes account of the easiness of positioning of the power generation element 4 and the ability to prevent positioning displacement and prevent damage to the power generation element 4.

Figure 2:
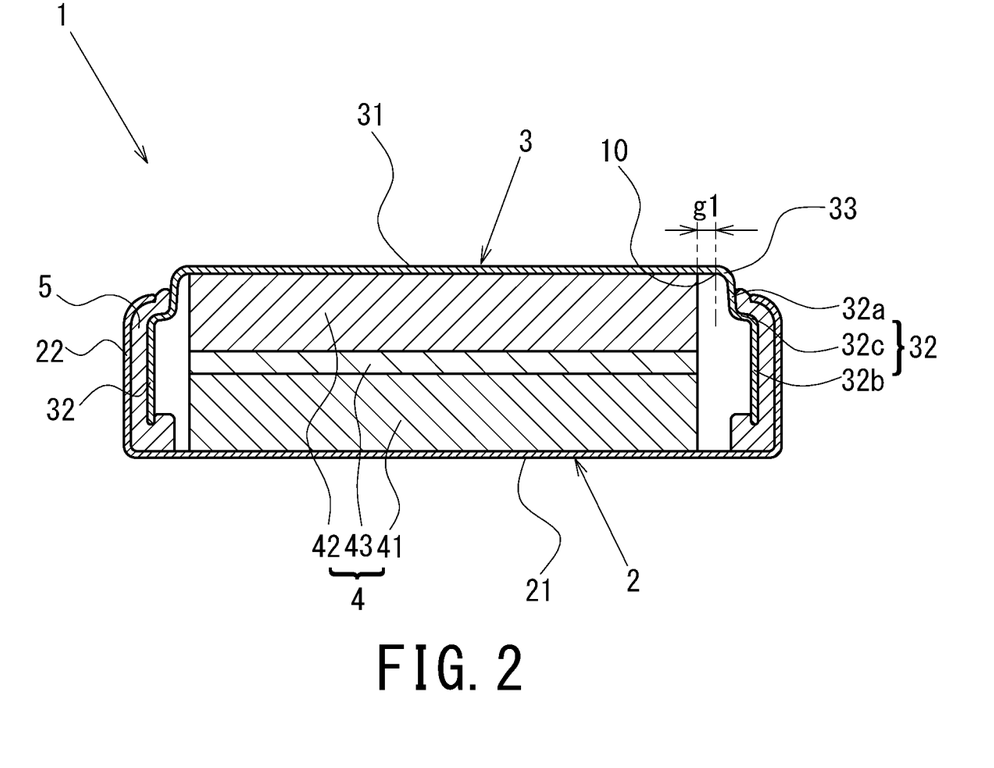
FIG. 2 is a cross-sectional view of the solid-state battery according to the first embodiment, illustrating its structure.

This play provided by the dimension of the clearance g1 allows a small positional displacement of the power generation element 4 and prevents a large positional displacement. Accordingly when the power generation element 4 is slightly displaced in position within the dimension of the clearance g1, the dimension of the clearance g1 remains not larger than 2.0 mm as measured at a position where its dimension is at its largest, as shown in FIG. 2. This is because the difference between the diameter of the inner surface of the flat portion 31 and the diameter of the power generation element 4 is not larger than 2.0 mm. Thus, since the dimension of the clearance g1 is not larger than 2.0 mm even at a position where its dimension is at its largest when a small positional displacement of the power generation element 4 is taken into account, a large positional displacement of the power generation element 4 is prevented and, at the same time, this small dimension of the clearance g1 facilitates positioning of the power generation element 4. The dimension of the clearance g1 at a position where its dimension is at its largest is to be not larger than 2.0 mm, preferably not larger than 1.0 mm, and more preferably not larger than 0.2 mm. It is to be understood that, as shown in FIG. 2, the clearance g1 is not formed for some sections of the upper edge of the outer peripheral surface of the power generation element 4 and the border 10 if the power generation element 4 is displaced in position by 2.0 mm. In view of this, if damage to the power generation element 4 during crimping of the exterior can 2 onto the seal can 3 is to be prevented, a clearance g1 is to be provided that has, as discussed above, a dimension not smaller than 0.01 mm, preferably not smaller than 0.05 mm, and more preferably not smaller than 0.09 mm.

A process of manufacturing the solid-state battery 1 of the first embodiment will now be specifically described with reference to FIG. 1.

First, an exterior can 2 and a seal can 3 are prepared by means of press-forming. During this, a curved-surface portion 33 is formed between the flat portion 31 and peripheral wall 32 of the seal can 3.

Next, a gasket 5 is formed by injection molding on the peripheral wall 32 of the seal can 3. The gasket 5 is formed from a resin material such as polyamide-based resin, polypropylene resin or polyphenylene sulfide resin.

Thereafter, the seal can 3 is turned in such a way that its open end faces upward, and a power generation element 4 is positioned inside the seal can 3. During this, a clearance g1 having one of the above-listed dimensions is formed between the upper edge of the outer peripheral surface of the power generation element 4 and the border 10. This facilitates positioning and placement of the power generation element 4 inside the seal can 3 and prevents positional displacement while preventing damage to the power generation element 4.

Next, the seal can 3 and the exterior can 2 are positioned in such a way that their open ends face each other, and then the open end of the seal can 3 is covered by the exterior can 2, where the cylindrical side wall 22 of the exterior can 2 is located outward of the peripheral wall 32 of the seal can 3.

During this, the gasket 5 is positioned between the cylindrical side wall 22 of the exterior can 2 and the peripheral wall 32 of the seal can 3. Then, the exterior can 2 is crimped onto the seal can 3 such that the edge portion of the cylindrical side wall 22 of the exterior can 2 faces the stepped portion 32c of the seal can 3. As discussed above, the power generation element 4 is positioned and placed inside the seal can 3 so as to prevent positional displacement; thus, in the resulting solid-state battery 1, the exterior can 2 has been crimped onto the seal can 3 with a sufficient crimping pressure without leading to improper crimping. As a result, the solid-state battery 1 prevents entry of water from the outside.

Second Embodiment

Now, a solid-state battery 1 according to a second embodiment of the present disclosure will be specifically described with reference to FIG. 3. The components shared by the solid-state batteries 1 of the first embodiment and the present embodiment will not be described, and only the components that constitute the differences between them will be specifically described.

The gasket 5 according to the second embodiment includes a gasket bottom portion 51. The gasket bottom portion 51 is contiguous with the gasket 5 located between the cylindrical side wall 22 and peripheral wall 32. The gasket bottom portion 51 is located between the bottom 21 of the exterior can 2 and the outspread portion 32b of the peripheral wall 32 of the seal can 3, and protrudes radially inwardly from the outspread portion 32b. The gasket bottom portion 51 includes a surface of inner circumference 51a, which faces the outer peripheral surface of the power generation element 4.

A clearance g2 is formed between the surface of inner circumference 51a of the gasket bottom portion 51 and the outer peripheral surface of the power generation element 4. To prevent positional displacement of the power generation element 4, the dimension of the clearance g2 is to be not larger than 1.0 mm, preferably not larger than 0.5 mm, and more preferably not larger than 0.1 mm. In the drawings, the clearance g2 is represented as left and right clearances. Thus, the total dimension of the clearance g2 is at most 2.0 mm, or less. The power generation element 4 is shaped as a circular column with a diameter smaller than the inner diameter of the surface of inner circumference 51a of the gasket 51 by 2.0 mm or less. In other words, the diameter of the power generation element 4 is smaller than the inner diameter of the surface of inner circumference 51a of the gasket 51, and the difference between the inner diameter of the surface of inner circumference 51a of the gasket 51 and the diameter of the power generation element 4 is 2.0 mm or less. On the other hand, if the surface of inner circumference 51a of the gasket bottom portion 51 and the outer peripheral surface of the power generation element 4 are in contact with each other, that is, if the clearance g2 is eliminated, the outer peripheral surface of the power generation element 4 may be damaged by its contact with the surface of inner circumference 51a of the gasket bottom portion 51, which is not flat as discussed below, during crimping of the exterior can 2 onto the seal can 3. Further, if the clearance g2 is excessively small, the power generation element 4 may get caught on the gasket bottom portion 51 during insertion of the power generation element 4 into the interior space of the solid-state battery 1, which may damage the power generation element 4 or gasket 5, deteriorating production efficiency. In view of this, the dimension of the clearance g2 is to be not smaller than 0.01 mm, preferably not smaller than 0.05 mm, and more preferably nor smaller than 0.09 mm.

As the clearance g2 is thus formed between the outer peripheral surface of the power generation element 4 and the surface of inner circumference 51a of the gasket bottom portion 51, the power generation element 4, also with respect to lower-end portions of the power generation element 4, can easily be positioned and placed inside the seal can 3 while preventing damage to the power generation element 4, thereby preventing positional displacement more reliably. Thus, in the solid-state battery 1 of the second embodiment, the exterior can 2 can be sufficiently crimped onto the seal can 3 while preventing positional displacement also with respect to lower-end portions of the power generation element 4 and without leading to improper crimping, thereby preventing entry of water from the outside in a more reliable manner.

As shown, the surface of inner circumference 51a of the gasket bottom portion 51 is typically not constituted by a surface that is uniform along the vertical direction: that is, it may not be flat where, for example, portions located toward the lower end in the drawing protrude radially inwardly relative to portions located toward the upper end, or, conversely portions located toward the upper end protrude radially inwardly. In view of this, as used herein, the dimension of the clearance g2 is defined as the dimension of the distance between that point on the surface of inner circumference 51a of the gasket bottom portion 51 which protrudes most radially inwardly on the one hand, and the outer peripheral surface of the power generation element 4, on the other.

Figure 3:
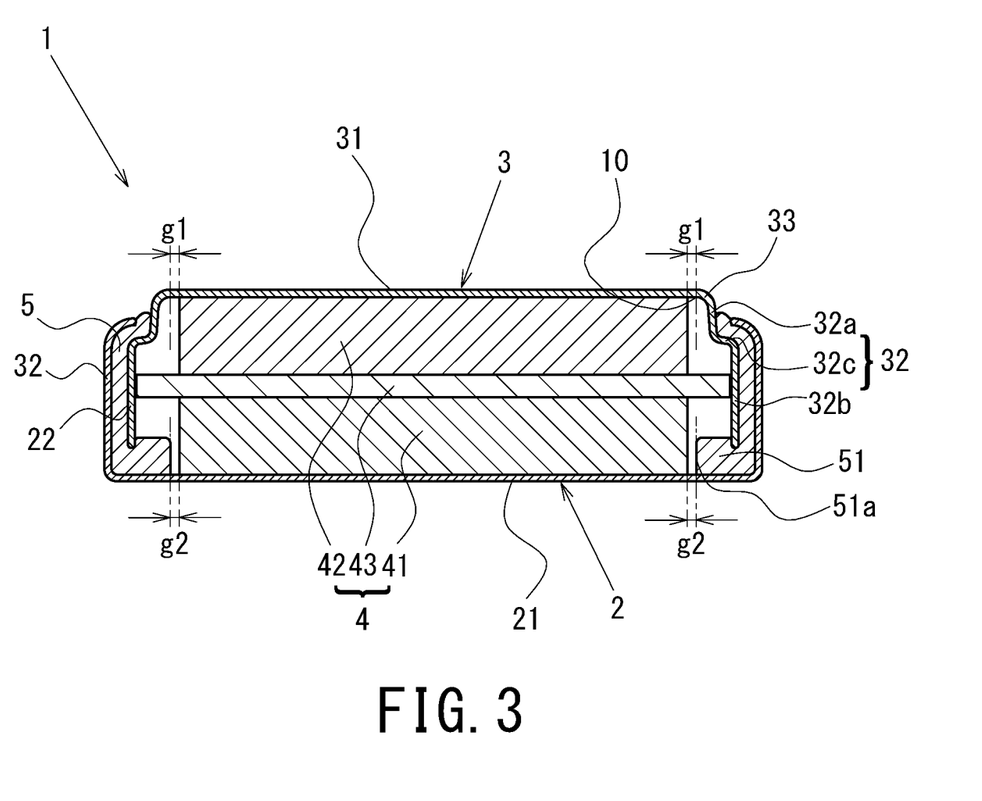
FIG. 3 is a cross-sectional view of a solid-state battery according to a second embodiment, illustrating its structure.

In some implementations, as shown in FIG. 3, the some peripheral portions of the solid electrolyte layer 43 may radially protrude from the outer peripheral surface of the cathode material layer 41 and the outer peripheral surface of the anode material layer 42. In such implementations, these peripheral portions of the solid electrolyte layer 43 may be contained in the space formed between the lower surface of the stepped portion 32c and the upper surface of the gasket bottom portion 51. Thus, in the solid-state battery 1 of the second embodiment, the space formed between the lower surface of the stepped portion 32c and the upper surface of the gasket bottom portion 51 may be effectively utilized. Alternatively the solid electrolyte layer 43 of the second embodiment may have a diameter equal to that of the cathode and anode material layers 41 and 42, as is the case with the first embodiment. Conversely in some implementations of the first embodiment, some peripheral portions of the solid electrolyte layer 43 may radially protrude from the outer peripheral surface of the cathode material layer 41 and the outer peripheral surface of the anode material layer 42, as is the case with the second embodiment.

Figure 4:
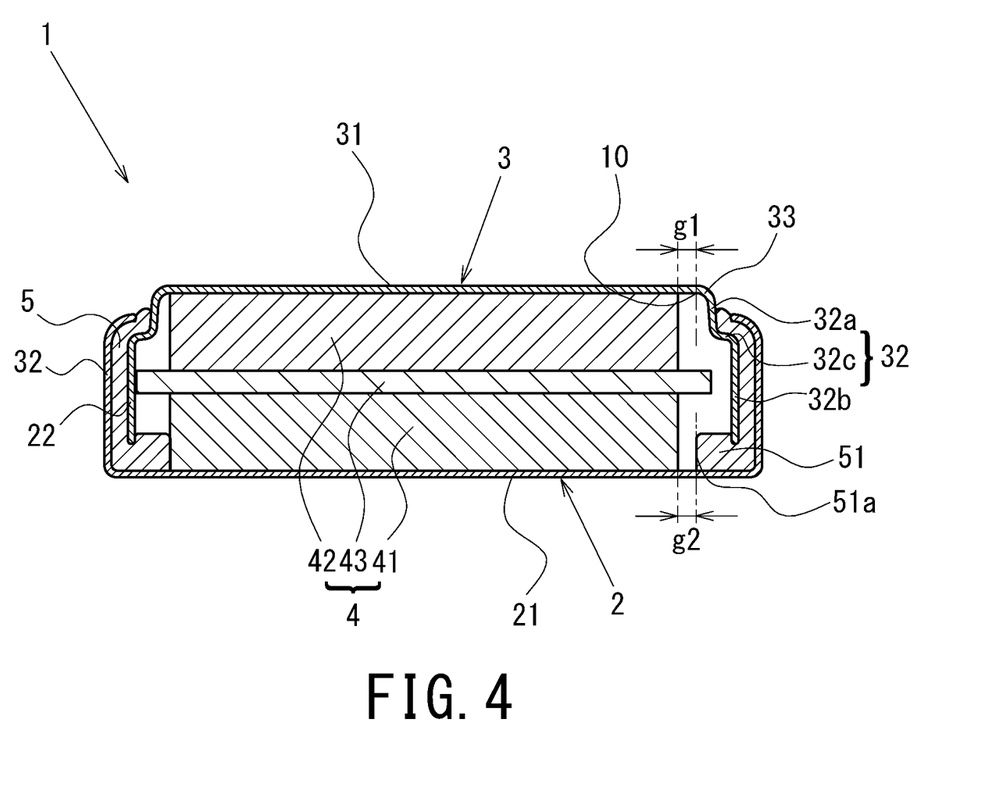
FIG. 4 is a cross-sectional view of the solid-state battery according to the second embodiment, illustrating its structure.

As shown in FIG. 4, similar to the clearance g1 of the first embodiment, the clearance g2 of the second embodiment provides a play. This play provided by the dimension of the clearance g2 allows a small positional displacement of the power generation element 4 and prevents a large positional displacement. Accordingly when the power generation element 4 is slightly displaced in position within the dimension of the clearance g2, the dimension of the clearance g2 remains not larger than 2.0 mm as measured at a position where its dimension is at its largest, as shown in FIG. 4. This is because the difference between the inner diameter of the surface of inner circumference 51a of the gasket bottom portion 51 and the diameter of the power generation element 4 is not larger than 2.0 mm. Thus, since the dimension of the clearance g2 is not larger than 2.0 mm even at a position where its dimension is at its largest when a small positional displacement of the power generation element 4 is taken into account, a large positional displacement of the power generation element 4 is prevented and, at the same time, this small dimension of the clearance g2 facilitates positioning of the power generation element 4. The dimension of the clearance g2 at a position where its dimension is at its largest is to be not larger than 2.0 mm, preferably not larger than 1.0 mm, and more preferably not larger than 0.2 mm. It is to be understood that, as shown in FIG. 4, the clearance g2 is not formed for some sections of the outer peripheral surface of the power generation element 4 and the surface of inner circumference 51a of the gasket 5 if the power generation element 4 is displaced in position by 2.0 mm. In view of this, if damage to the power generation element 4 during crimping of the exterior can 2 onto the seal can 3 is to be prevented, a clearance g2 is to be provided that has, as discussed above, a dimension not smaller than 0.01 mm, preferably not smaller than 0.05 mm, and more preferably not smaller than 0.09 mm. Furthermore, the radial dimension of a solid electrolyte layer 43 that radially protrudes, discussed above, is decided appropriately depending on the dimension of the clearance g2 at a position where its dimension is at its largest.

Third Embodiment

Figure 5:
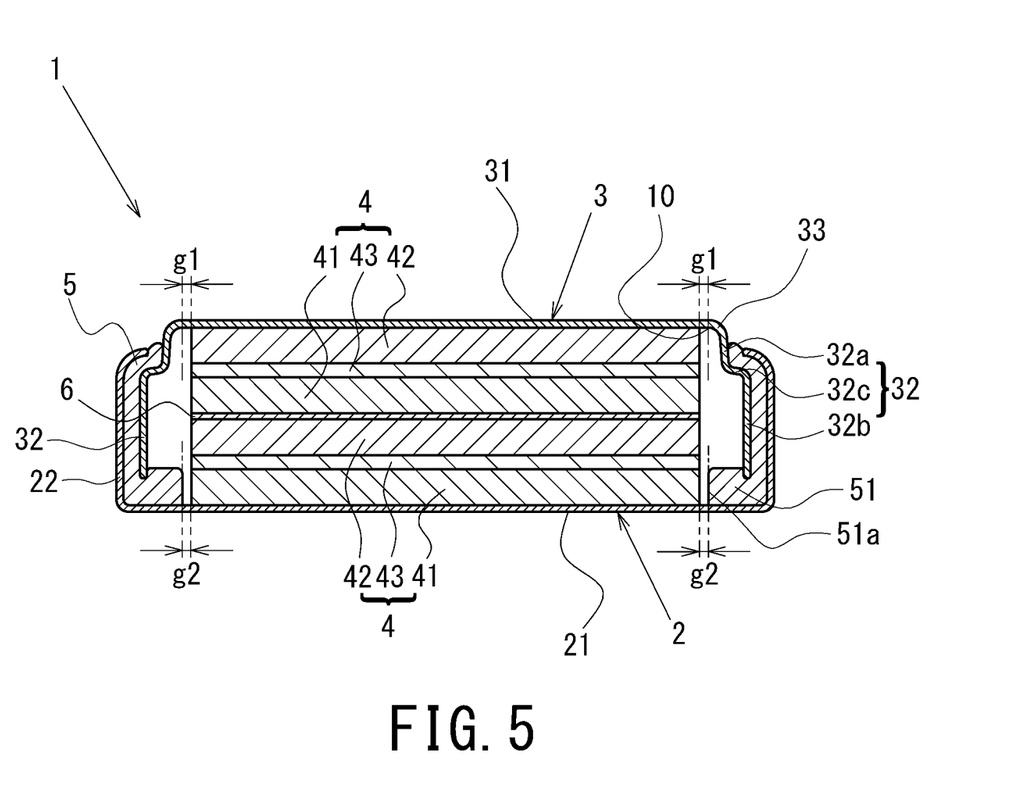
FIG. 5 is a cross-sectional view of a solid-state battery according to a third embodiment, illustrating its structure.

Now, a solid-state battery 1 according to a third embodiment of the present disclosure will be specifically described with reference to FIG. 5. The components shared by the solid-state batteries 1 of the first and second embodiments and that of the present embodiment will not be described, and only the components that constitute the differences between the solid-state batteries 1 of the first and second embodiments, on the one hand, and that of the present embodiment, on the other, will be specifically described.

In the solid-state battery 1 of the third embodiment, two power generation elements 4 connected in series and stacked on top of each other are contained in the space between the exterior can 2 and seal can 3. As shown, the upper one of the power generation elements 4 is adjacent to the flat portion 31 of the seal can 3. The lower one of the power generation elements 4 is adjacent to the bottom 21 of the exterior can 2. A current collector sheet 6 is positioned between the two power generation elements 4. This solid-state battery 1 is a so-called bipolar solid-state battery 1. Typically each power generation element 4 includes a cathode material layer 41, an anode material layer 42 and a solid electrolyte layer 43, each power generation element solidified by a predetermined pressure. Thus, typically, the cathode material layer 41, anode material layer 42 and solid electrolyte layer 43 are not displaced in position from one another. On the other hand, in a bipolar solid-state battery 1, the two power generation elements 4 are simply placed on top of each other with a current collector sheet 6 located therebetween. As such, the two power generation elements 4 may be displaced in position from each other. A current collector may be provided between the upper one of the power generation elements 4 and the flat portion 31 of the seal can 3. A current collector may be provided between the lower one of the power generation elements 4 and the bottom 21 of the exterior can 2.

As shown, a clearance g1 is formed between the upper edge of the outer peripheral surface of the upper power generation element 4 and the border 10. To facilitate positioning of the power generation elements 4 and prevent positional displacement thereof, the dimension of the clearance g1 is to be not larger than 1.0 mm, preferably not larger than 0.5 mm, and more preferably not larger than 0.1 mm. To prevent damage to the power generation element 4, the dimension of the clearance g1 is to be not smaller than 0.01 mm, preferably not smaller than 0.05 mm, and more preferably not smaller than 0.09 mm. Further, a clearance g2 is formed between the outer peripheral surface of the lower power generation element 4 and the surface of inner circumference 51a of the gasket bottom portion 51. The dimension of the clearance g2, too, is to be not larger than 1.0 mm, more preferably not larger than 0.5 mm, and more preferably not larger than 0.1 mm, and is to be not smaller than 0.01 mm, preferably not smaller than 0.05 mm, and more preferably not smaller than 0.09 mm.

As the clearance g1 is thus formed between the upper edge of the outer peripheral surface of the upper one of the power generation elements 4 and the border 10, the upper power generation element 4, during placement thereof inside the seal can 3, can easily be positioned while preventing damage thereto, and positional displacement is prevented. Further, the clearance g2 formed between the outer peripheral surface of the lower one of the power generation elements 4 and the surface of inner circumference 51a of the gasket bottom portion 51 prevents positional displacement of the lower power generation element 4 during crimping of the exterior can 2 onto the seal can 3 while preventing damage to the power generating element 4, without deteriorating production efficiency. Thus, even in a bipolar solid-state battery 1, the exterior can 2 can be sufficiently crimped onto the seal can 3 without leading to improper crimping, thereby preventing entry of water from the outside.

Further, in a bipolar solid-state battery 1, the upper and lower power generation elements 4 may have different diameters. In such implementations, the diameter of the lower power generation element 4 is larger than the diameter of the upper power generation element 4. This will increase the battery capacity of the solid-state battery 1. In such implementations with upper and lower power generation elements 4 with different diameters, too, providing the clearance g1 will facilitate positioning the upper power generation element 4 and placing it inside the seal can 3 while preventing damage to the upper power generation element 4, thereby preventing positional displacement. Further, providing the clearance g2 will prevent positional displacement while preventing damage to the lower power generation element 4.

Figure 6:
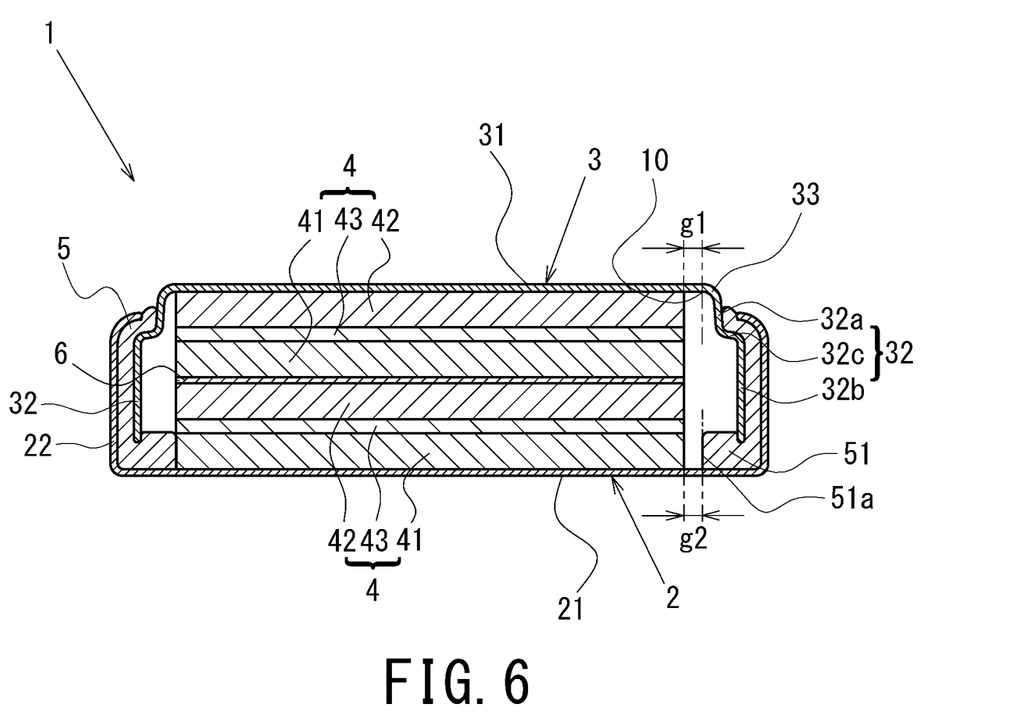
FIG. 6 is a cross-sectional view of the solid-state battery according to the third embodiment, illustrating its structure.

As shown in FIG. 6, similar to the clearance g1 of the first embodiment and the clearance g2 of the second embodiment, each of the clearances g1 and g2 of the third embodiment provides a play. Thus, when the power generation elements 4 are slightly displaced in position, the dimension of each of the clearances g1 and g2 remains not larger than 2.0 mm at a position where its dimension is at its largest, as shown in FIG. 6. The clearances g1 and g2 of the third embodiment are similar to the clearance g1 of the first embodiment and the clearance g2 of the second embodiment, and will not be described in detail. It is to be noted that, even in implementations where the upper and lower power generation elements 4 have different diameters, the dimension of each of the clearances g1 and g2 is not larger than 2.0 mm at a position where its dimension is at its largest.

The solid-state battery 1 of the third embodiment may include three or more power generation elements 4 stacked on top of one another.

Fourth Embodiment

Now, a solid-state battery 1 according to a fourth embodiment of the present disclosure will be specifically described with reference to FIG. 7. The solid-state battery 1 of the fourth embodiment is basically the same as the solid-state battery 1 of the third embodiment. Accordingly the components shared by the solid-state batteries 1 of the third embodiment and the present embodiment will not be described, and only the components that constitute the differences between the solid-state battery 1 of the third embodiment and that of the present embodiment will be specifically described.

The inner surface of the base-end portion 32a includes a side surface 34 contiguous with the inner surface of the curved-surface portion 33 and a curvature surface 35 contiguous with the side surface 34 and the inner surface of the stepped portion 32c. As shown in FIG. 7, in cross-sectional view, the side surface 34 is represented as a straight line, and the curvature surface 35 as a curved line that starts at that edge of the side surface 34 which is adjacent to the stepped portion 32c and then curves radially outwardly. The base-end portion 32a includes a border 11 between the side surface 34 and curvature surface 35. The height h1 shown in FIG. 7 is the distance between the inner surface of the flat portion 31 and the border 11. That is, the height h1 is the axial dimension of the distance between the inner surface of the flat portion 31 and the border 11.

Figure 7:
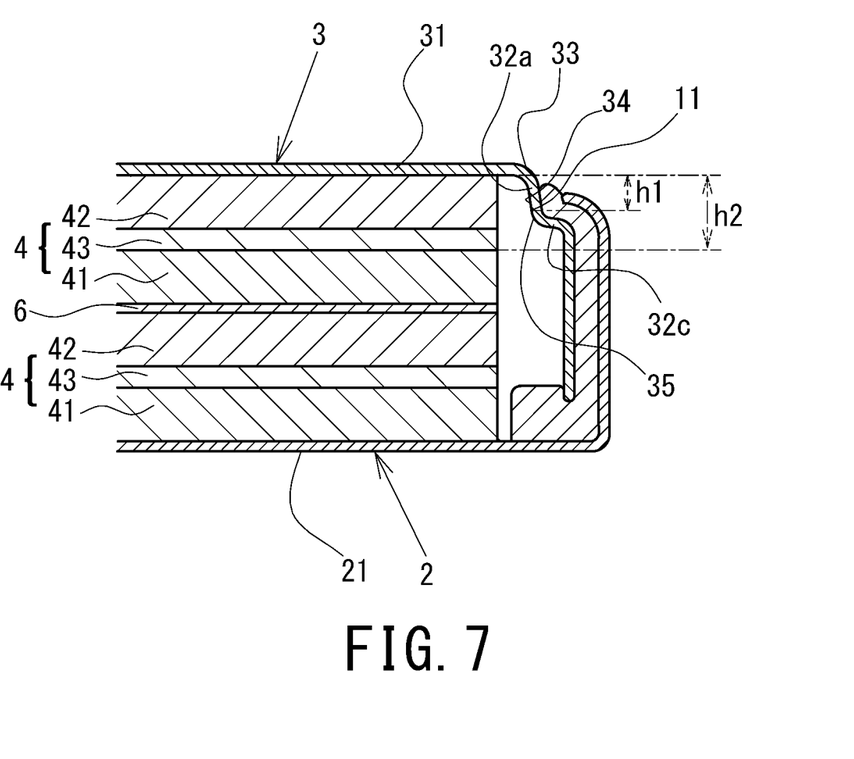
FIG. 7 is an enlarged cross-sectional view of a solid-state battery according to a fourth embodiment, illustrating its structure.

As shown in FIG. 7, the height h1 is smaller than a height h2. The height h2 is the axial dimension of the distance between the inner surface of the flat portion 31 and the upper edge of the outer peripheral surface of that cathode material layer 41 which is located closest to the flat portion 31. In other words, the height h2 is the axial dimension of the distance between the inner surface of the flat portion, on the one hand, and the border between that solid electrolyte layer 43 which is located closest to the flat portion and the associated cathode material layer 41. A current collector may be provided between the flat portion 31 of the seal can 3 and that anode material layer 42 which is located closest to the flat portion 31. Thus, in the bipolar solid-state battery 1, the peripheral wall 32 of the seal can 3 is less likely to contact the cathode material layer 41, thereby preventing short circuit. In a bipolar solid-state battery 1, a plurality of power generation elements 4 are connected in series and stacked on top of each other. As such, in the limited interior space of the solid-state battery 1, the anode material layer 42 and solid electrolyte layer 43 of each power generation element 4 has a small thickness. To prevent short circuit, the height h1 may be set depending on the height h2, which is the distance between the inner surface of the flat portion 31 and the upper edge of the outer peripheral surface of that anode material layer 42 which is located closest to the flat portion 31, thereby preventing short circuit even in a bipolar solid-state battery.

The side surface 34 expand radially outwardly with increasing distance from the flat portion 31 in the axial direction. For example, the side surface 34 is a taper surface inclined radially outwardly. Thus, end portions of the side surface 34 adjacent to the stepped portion 32c are more radially outward, i.e., more distant from the power generation element 4 as it goes in the axial direction, preventing short circuit in a more reliable manner.

In the fourth embodiment, an anode material layer 42 is the component of a power generation element 4 located closest to the flat portion 31; in other implementations, a power generation elements 4 may be stacked in such a manner that a cathode material layer 41 is the component located closest to the flat portion 31. In such implementations, the height h1 is to be smaller than the higher h2 which is now the distance between the inner surface of the flat portion 31, on the one hand, and the upper edge of the outer peripheral surface of that anode material layer 42 which is located closest to the flat portion 31, on the other, thereby preventing short circuit. Further, the side surface 34 may be formed to expand radially outwardly with increasing distance from the flat portion 31 in the axial direction, thereby preventing short circuit in a more reliable manner.

Although embodiments have been described, the present disclosure is not limited to these embodiments, and various modifications are possible without departing from the spirit of the disclosure

EXPLANATION OF CHARACTERS

1: solid-state battery
2: exterior can; 21: can bottom; 22: cylindrical side wall
3: seal can; 31: flat portion; 32: peripheral wall; 32a: base-end portion; 32b: outspread portion; 32c: stepped portion; 33: curved-surface portion; 34: side surface; 35: curvature surface
4: power generation element; 41: cathode material layer; 42: anode material layer; 43: solid electrolyte layer
5: gasket; 51: gasket bottom portion; 51a: surface of inner circumference
6: current collector sheet
10: border; 11: border
g1, g2: clearances

The invention claimed is:
1. A solid-state battery comprising:
an exterior can having a can bottom and a cylindrical side wall;
a seal can having a flat portion and a peripheral wall and facing the exterior can; and
a power generation element contained between the exterior can and the seal can and including a cathode material layer, an anode material layer, and a solid electrolyte layer located between the cathode material layer and the anode material layer,
wherein the flat portion and the peripheral wall are contiguous to each other with a curved-surface portion provided therebetween,
a first clearance is defined between an upper edge of an outer peripheral surface of the power generation element, on one hand, and a first border between an inner surface of the flat portion and an inner surface of the curved-surface portion, on the other hand, the first clearance being annular in shape in plan view, and the first clearance has a radial dimension not larger than 2.0 mm at a position where the first clearance is at its largest.

2. The solid-state battery according to claim 1, wherein a distance between a diameter of the inner surface of the flat portion and a diameter of the power generation element is not larger than 2.0 mm.

3. The solid-state battery according to claim 1, wherein the first clearance has a radial dimension not smaller than 0.01 mm.

4. The solid-state battery according to claim 1, wherein the peripheral wall includes a base-end portion located adjacent to the curved-surface portion, an outspread portion having a diameter larger than an outer diameter of the base-end portion and located adjacent to an open edge, and a stepped portion between the base-end portion and the outspread portion.

5. The solid-state battery according to claim 1, further comprising:
   a gasket located between the cylindrical side wall and the peripheral wall,
   wherein the gasket includes a gasket bottom portion located between the can bottom and an open edge of the peripheral wall and protruding radially inwardly from the peripheral wall,
   a second clearance is defined between the outer peripheral surface of the power generation element and a surface of inner circumference of the gasket bottom portion, and
   the second clearance has a radial dimension not larger than 2.0 mm at a position where the second clearance is at its largest.

6. The solid-state battery according to claim 5, wherein a difference between an inner diameter of the surface of inner circumference of the gasket bottom portion and a diameter of the power generation element is not larger than 2.0 mm.

7. The solid-state battery according to claim 5, wherein the second clearance has a radial dimension not smaller than 0.01 mm.

8. The solid-state battery according to claim 5, wherein a plurality of power generation elements connected in series are stacked on top of each other and contained between the can bottom and the flat portion,
   the first clearance is defined between an upper edge of an outer peripheral surface of that power generation element which is located closest to the flat portion, on one hand, and the first border between the inner surface of the flat portion and the inner surface of the curved-surface portion, on the other hand, and
   the second clearance is defined between an outer peripheral surface of that power generation element which is located closest to the can bottom and the surface of inner circumference of the gasket bottom portion.

9. The solid-state battery according to claim 4, wherein a plurality of power generation elements connected in series are stacked on top of each other and contained between the can bottom and the flat portion,
   an inner surface of the base-end portion has a second border between a side surface contiguous to the inner surface of the curved-surface portion and a curvature surface contiguous to the side surface and an inner surface of the stepped portion,
   if that power generation element located closest to the flat portion is a cathode material layer, a height distance between the inner surface of the flat portion and the second border is smaller than a height distance between the inner surface of the flat portion and an upper edge of an outer peripheral surface of that anode material layer which is closest to the flat portion, and,
   if that power generation element located closest to the flat portion is an anode material layer, the height distance between the inner surface of the flat portion and the second border is smaller than a height distance between the inner surface of the flat portion and an upper edge of an outer peripheral surface of that cathode material layer which is closest to the flat portion.

10. The solid-state battery according to claim 9, wherein the side surface expands radially outwardly with increasing distance from the flat portion in an axial direction.

* * * * *